United States Patent
Eller et al.

(10) Patent No.: US 8,458,330 B2
(45) Date of Patent: Jun. 4, 2013

(54) CONGESTION MANAGEMENT AND LATENCY PREDICTION IN CSMA MEDIA

(75) Inventors: Riley Eller, Seattle, WA (US); Dennis Edwards, Seattle, WA (US); Jeremy Bruestle, Seattle, WA (US); Mark L. Tucker, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 0 days.

(21) Appl. No.: 13/532,547

(22) Filed: Jun. 25, 2012

(65) Prior Publication Data
US 2012/0265877 A1 Oct. 18, 2012

Related U.S. Application Data

(63) Continuation of application No. 12/278,146, filed as application No. PCT/US2007/061485 on Feb. 1, 2007, now Pat. No. 8,209,433.

(60) Provisional application No. 60/764,013, filed on Feb. 1, 2006.

(51) Int. Cl.
*G06F 15/173* (2006.01)
*G06F 15/16* (2006.01)

(52) U.S. Cl.
USPC ............... 709/224; 709/232; 709/233

(58) Field of Classification Search
USPC .......................... 709/224, 232, 233
See application file for complete search history.

(56) References Cited

U.S. PATENT DOCUMENTS

| | | | |
|---|---|---|---|
| 7,295,614 B1 | 11/2007 | Shen et al. | |
| 7,453,885 B2 | 11/2008 | Rogers | |
| 7,529,247 B2 | 5/2009 | Rogers | |
| 7,535,839 B2 | 5/2009 | Kadaba et al. | |
| 7,551,559 B1 | 6/2009 | Jonnala et al. | |
| 7,751,370 B2 | 7/2010 | Tiedemann et al. | |
| 7,782,786 B1 | 8/2010 | Natarajan et al. | |
| 8,005,030 B2 | 8/2011 | Stephenson et al. | |
| 8,040,811 B2 | 10/2011 | Edwards et al. | |
| 8,068,437 B2 | 11/2011 | Hardy | |
| 8,209,433 B2 * | 6/2012 | Eller et al. | 709/235 |
| 2002/0131386 A1 | 9/2002 | Gwon | |
| 2003/0043925 A1 | 3/2003 | Stopler et al. | |
| 2006/0171523 A1 | 8/2006 | Greenwell | |
| 2008/0052394 A1 | 2/2008 | Bugenhagen et al. | |
| 2008/0270124 A1 | 10/2008 | Son et al. | |

FOREIGN PATENT DOCUMENTS

JP 2001142747 5/2001

* cited by examiner

*Primary Examiner* — Kristie Shingles
(74) *Attorney, Agent, or Firm* — Lowe Graham Jones PLLC

(57) ABSTRACT

A facility for congestion management and latency prediction is described. In various embodiments, the facility sums a series of fractional transmission delays wherein each fractional transmission delay is measured as a probability of a failed transmission attempt multiplied by the cost of the failed transmission attempt, and provides the sum.

10 Claims, 1 Drawing Sheet

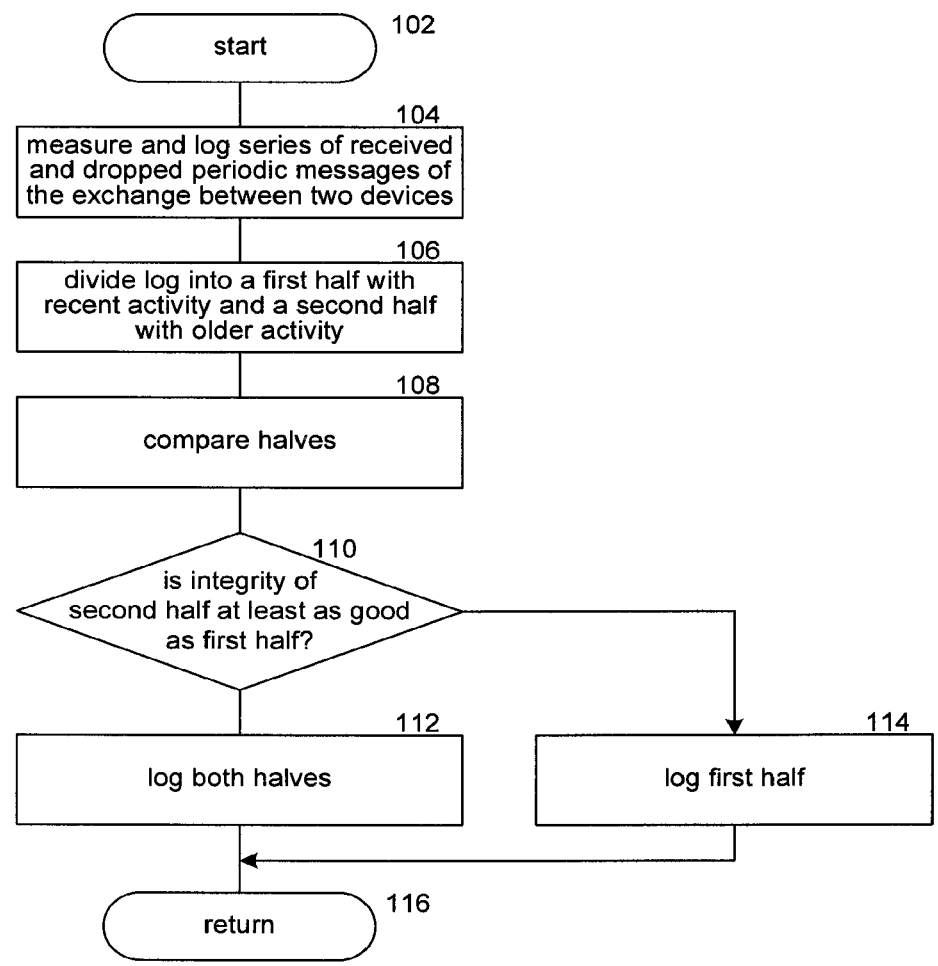

CONGESTION MANAGEMENT AND LATENCY PREDICTION IN CSMA MEDIA

PRIORITY CLAIM

This application is a Continuation of U.S. Utility application entitled "CONGESTION MANAGEMENT AND LATENCY PREDICTION IN CSMA MEDIA," having application Ser. No. 12/278,146, filed Aug. 1, 2008, and completed on Jun. 26, 2009, which will issue as U.S. Pat. No. 8,209,433 on Jun. 26, 2012 and which is a U.S. National Stage application of International Application No. PCT/US07/61485, entitled "CONGESTION MANAGEMENT AND LATENCY PREDICTION IN CSMA MEDIA," filed Feb. 1, 2007, which claims the benefit of U.S. Provisional Patent Application Ser. No. 60/764,013, entitled "CONGESTION MANAGEMENT AND LATENCY PREDICTION IN CSMA MEDIA," filed Feb. 1, 2006, and is related to U.S. Provisional Patent Application Ser. No. 60/763,977 entitled "PROTOCOL CIRCUIT LAYER," filed Feb. 1, 2006, and U.S. Provisional Patent Application Ser. No. 60/763,959 entitled "PROTOCOL LINK LAYER," filed Feb. 1, 2006. Accordingly, the present application claims priority to and the benefit of the filing dates of U.S. application Ser. No. 12/278, 146, International Application No. PCT/US07/61485 and Provisional Application No. 60/764,013. Further, the present application incorporates by reference U.S. application Ser. No. 12/278,146, International Application No. PCT/US07/61485, Provisional Application No. 60/764,013, Provisional Application No. 60/763,977, and Provisional Application No. 60/763,959, herein in their entireties.

BACKGROUND

Computers have been networked to exchange data between them for decades. One important network, the Internet, comprises a vast number of computers and computer networks interconnected through communication channels. The Internet is used for various reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Markup Language ("XML") and Wireless Access Protocol ("WAP"). XML provides greater flexibility over HTML. WAP provides, among other things, the ability to view web pages over handheld, wireless devices, such as cell phones and portable computers (e.g. PDA's). All of these protocols provide easier ways to provide information to people via various data processing devices. Many other protocols and means for exchanging data between data processing device continue to develop to further aid the exchange of information.

In wireless communications, it is common to remedy the problem of media collision by using acknowledged receipt with finite retransmission strategy for point-to-point messages. In order to allow for communication networks of varying density and to ameliorate congestion, it is also common to use delays with an exponentially-increasing coefficient. Broadcast messages, however, may not be able to effectively use acknowledged receipt because the number of recipients is unreliable.

One undesirable characteristic of this strategy is that the most congested and least reliable communication links tend to experience the highest message delivery latency. That latency tends also to increase the probability that another message will be waiting on queue before the completion of the previous message delivery. The combination of these factors tends to worsen the initial congestion, making it decreasingly likely that the network will recover on its own. In order to avoid this set of problems, it may be necessary to make routing decisions farther away from the congestion point. That in turn may require a method for the nodes in the congested region to report their propensity for message delay.

Naïve methods for measuring message delay collect only one timing datum per message, and then require a significant number of messages to create a reasonable approximation of the current retransmission delay. These estimates tend to be skewed with respect to time, and that skew tends to be unresponsive to the same bursts of activity that cause the initial congestion to become unmanageable.

BRIEF DESCRIPTION OF THE DRAWINGS

FIG. 1 is a flow diagram illustrating a technique for congestion management and latency prediction in CSMA media.

DETAILED DESCRIPTION

Estimating Peer Broadcast Reliability

The basic unit of measure in this method is the broadcast message. Each participating node transmits a short broadcast message on a fixed interval. The format of the message is a simple bitfield representing an integer counter that increments by 1 each transmission. Each recipient measures the time between any two messages and divides that duration by the difference in the message counter to derive the sender's transmission period. For every such period that passes, the recipient records a single bit regarding whether that sender's transmission was received (one) or not received (zero). The history of these bits forms the basis for the measurement "peer broadcast reliability".

Using an ordered series of bits to represent the history of receipts and failures, we can estimate the likelihood of receiving any one broadcast from a given peer by counting the ones and dividing by the number of bits in the series. Since the information becomes decreasingly valuable over time, it is desirable to remove the oldest data from time to time. Using a simple static series length tends to suffer from one of two problems: either the series is too short which makes the algorithm respond too quickly to momentary events, or else the series is too long which makes the algorithm respond too slowly to avoid the initial congestion.

To avoid these problems, we split the series into halves. We create a null hypothesis that the difference between the proportion of ones in each of the two subseries is not statistically significant. After we record each element into the series, we evaluate the null hypothesis. If the null hypothesis is demonstrated to be false, then we discard the oldest half of the series. In this fashion, the history grows during periods of relatively stable communication and provides a stable estimate of the peer broadcast reliability. When bursts of congestion occur, the probability of broadcast reception decreases rapidly and the newer half of the history becomes significantly worse than the oldest half. In this situation, the estimate of peer broadcast reliability becomes relatively volatile in order to quickly respond to the changing state of the medium.

Predicting Unicast Transmission Latency

In order to extend a relatively accurate estimate of peer broadcast reliability into a prediction of unicast transmission latency, it may be necessary to extend the justification for broadcast loss into the algorithm for unicast retransmission. Pleasantly, modern back-off algorithms use simple integer coefficients that double with each failed transmission. Thus the unicast latency can be seen as the summation of a series of fractional transmission delays, each defined as the probability of failed transmission attempt multiplied by the cost of that transmission attempt. For transmission schemes using a $2^n$ exponential back-off algorithm, the predicted latency is proportional to $2^{(r/p)}$ where p is the peer broadcast reliability and r is the retry delay.

Semantic Concepts Involved
  transmission latency
  message delay
  predictive algorithm
  CSMA Media
  media collision
  retransmission strategy
  back-off algorithm
  exponential back-off
  network congestion
  congestion point FIG. 1 is a flow diagram illustrating a routine for providing congestion management and latency prediction in CSMA media. At block 102, the routine begins. At block 104, the routine measures and logs a series of received and dropped periodic messages exchanged between two networked devices. At block 106, the routine divides the log into a first half containing recent activity and a second half containing older activity. At block 108, the routine compares the integrity (and perhaps other properties) of the two halves. If the integrity of the older half is at least as good as the integrity of the first half, the routine continues at block 112. Otherwise, the routine continues at block 114. At block 112, the routine logs both halves. At block 114, the routine logs the half containing recent activity. At block 116, the routine returns.

The described technology provides at least a method for predicting latency of links in broadcast networks and a method for managing congestion in broadcast networks.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A non-transitory computer-readable medium comprising executable program code that when executed by a processing element implements a method to determine data-transmission congestion between a first network node and a second network node, the method comprising:

monitoring a series of received and dropped messages communicated between the first network node and the second network node, wherein the received messages are associated with a first bit and the dropped messages are associated with a second bit;

generating a log of data as each new message is monitored, wherein the log of data is an ordered series of the first bits and the second bits ordered from a current bit associated with a current message to an oldest bit associated with an oldest message, wherein a first new bit or a second new bit associated with the new monitored message is added to the log of data as the current bit, and wherein the oldest bit is removed from the log of data;

dividing, as each new message is monitored, the log of data into a first log portion containing bits associated with messages monitored during a first time period and a second log portion containing bits associated with messages monitored during a second time period, wherein the second time period is earlier than the first time period;

determining, as each new message is monitored, a first number, wherein the first number corresponds to a number of the first bits in the first log portion;

determining, as each new message is monitored, a second number, wherein the second number corresponds to a number of the first bits in the second log portion;

if the first number is at least equal to the second number by a predetermined criterion, continuing to generate the log of data as a next message is provided; and if the first number is less than the second number by the predetermined criterion, discarding the second log portion and continuing to generate the log of data using a new number of bits as the next message is provided, wherein the new number of bits corresponds to the number of the bits in the first log portion, wherein the first number equals the number of the first bits in the first log portion, and wherein the second number equals the number of the first bits in the second log portion.

2. A non-transitory computer-readable medium comprising executable program code that when executed by a processing element implements a method to determine data-transmission congestion between a first network node and a second network node, the method comprising:

monitoring a series of received and dropped messages communicated between the first network node and the second network node, wherein the received messages are associated with a first bit and the dropped messages are associated with a second bit;

generating a log of data as each new message is monitored, wherein the log of data is an ordered series of the first bits and the second bits ordered from a current bit associated with a current message to an oldest bit associated with an oldest message, wherein a first new bit or a second new bit associated with the new monitored message is added to the log of data as the current bit, and wherein the oldest bit is removed from the log of data;

dividing, as each new message is monitored, the log of data into a first log portion containing bits associated with messages monitored during a first time period and a second log portion containing bits associated with messages monitored during a second time period, wherein the second time period is earlier than the first time period;

determining, as each new message is monitored, a first number, wherein the first number corresponds to a number of the first bits in the first log portion;

determining, as each new message is monitored, a second number, wherein the second number corresponds to a number of the first bits in the second log portion;

if the first number is at least equal to the second number by a predetermined criterion, continuing to generate the log of data as a next message is provided; and if the first number is less than the second number by the predetermined criterion, discarding the second log portion and continuing to generate the log of data using a new number of bits as the next message is provided, wherein the new number of bits corresponds to the number of the bits in the first log portion, wherein the first number equals a number of the second bits in the first log portion, and wherein the second number equals a number of the second bits in the second log portion.

3. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein the first time period and the second time period correspond to a time period in which the predefined number of monitored messages are monitored.

4. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein the first and second log portions comprise two halves of the log of data.

5. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein each first bit is one of a first binary number that indicates that the message was received and each second bit is a second binary number that indicates that the message was dropped.

6. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein the first number equals the number of the first bits in the first log portion, and wherein the second number equals the number of the first bits in the second log portion.

7. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein the first number equals a number of the second bits in the first log portion, and wherein the second number equals a number of the second bits in the second log portion.

8. A method to determine data-transmission congestion between a first network node and a second network node, the method comprising:

monitoring a series of new messages between the first network node and the second network node, wherein received messages are associated with a first bit and dropped messages are associated with a second bit;

generating, in response to monitoring each new message, a log of data comprising a total number of bits corresponding to a predefined number of monitored messages, wherein the log of data is an ordered series of the first and second bits ordered from a current bit associated with a current message to an oldest bit associated with an oldest message, wherein a new bit associated with the new monitored message is added as the current bit into the log of data, and wherein a bit associated with the oldest message is removed from the log of data;

dividing, in response to monitoring each new message, the log of data into a first log portion containing a first number of bits associated with a first number of messages monitored during a first time period and a second log portion containing a second number of bits associated with a second number of messages monitored during a second time period, wherein the second time period is earlier than the first time period, and wherein the first number of bits associated with the first number of messages and the second number of bits associated with the second number of messages equals the total number of bits;

determining, in response to monitoring each new message, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits as a next message is monitored; and if the first number is less than the second number by the predetermined criterion, discarding the second log portion and continuing to generate the log of data using a new number of bits as the next message is monitored, wherein the new number of bits corresponds to the first number of bits in the first log portion, wherein the first number corresponds to a ratio of first bits to a total number of bits in the first log portion, and wherein the second number corresponds to a ratio of first bits to a total number of bits in the second log portion.

9. A method to determine data-transmission congestion between a first network node and a second network node, wherein received messages are associated with a first bit and dropped messages are associated with a second bit, the method comprising:

generating, as each new message is monitored, a log of data comprising a total number of bits corresponding to a number of monitored messages, wherein the log of data is an ordered series of the first bits and the second bits ordered from a current bit associated with a current message to an oldest bit associated with an oldest message, wherein the bit associated with the new monitored message is added as the current bit into the log of data, and wherein a bit associated with the oldest message is removed from the log of data;

dividing, as each new message is monitored, the log of data into a first log portion containing the first bits and the second bits associated with messages monitored during a first time period and a second log portion containing the first bits and the second bits associated with messages monitored during a second time period, wherein the second time period is earlier than the first time period;

determining, as each new message is monitored, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits; and if the first number is less than the second number by the predetermined criterion, discarding the second log portion and continuing to generate the log of data using a new number of bits as a next message is provided, wherein the new number of bits corresponds to the number of the first bits and the second bits in the first log portion, wherein the first number equals the number of the first bits in the first log portion, and wherein the second number equals the number of the first bits in the second log portion.

10. A method to determine data-transmission congestion between a first network node and a second network node, wherein received messages are associated with a first bit and dropped messages are associated with a second bit, the method comprising:

generating, as each new message is monitored, a log of data comprising a total number of bits corresponding to a number of monitored messages, wherein the log of data is an ordered series of the first bits and the second bits ordered from a current bit associated with a current message to an oldest bit associated with an oldest message, wherein the bit associated with the new monitored message is added as the current bit into the log of data, and wherein a bit associated with the oldest message is removed from the log of data;

dividing, as each new message is monitored, the log of data into a first log portion containing the first bits and the second bits associated with messages monitored during a first time period and a second log portion containing the first bits and the second bits associated with messages monitored during a second time period, wherein the second time period is earlier than the first time period;

determining, as each new message is monitored, a first number corresponding to a number of the first bits in the first log portion;

determining, as each new message is monitored, a second number corresponding to a number of the first bits in the second log portion;

comparing, as each new message is monitored, the first number and the second number;

if the first number is at least equal to the second number by a predetermined criterion, continuing to generate the log of data using the total number of bits; and if the first number is less than the second number by the predetermined criterion, discarding the second log portion and continuing to generate the log of data using a new number of bits as a next message is provided, wherein the new number of bits corresponds to the number of the first bits and the second bits in the first log portion, wherein the first number equals a number of the second bits in the first log portion, and wherein the second number equals a number of the second bits in the second log portion.

* * * * *